(12) United States Patent
Leone et al.

(10) Patent No.: US 10,196,067 B2
(45) Date of Patent: Feb. 5, 2019

(54) METHOD AND SYSTEM FOR CONTROLLING WATER INJECTION

(71) Applicant: Ford Global Technologies, LLC, Dearborn, MI (US)

(72) Inventors: Thomas G. Leone, Ypsilanti, MI (US); Kenneth James Miller, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 379 days.

(21) Appl. No.: 15/216,497

(22) Filed: Jul. 21, 2016

(65) Prior Publication Data
US 2018/0022352 A1  Jan. 25, 2018

(51) Int. Cl.
| | |
|---|---|
| *B60W 30/188* | (2012.01) |
| *B60W 10/06* | (2006.01) |
| *B60W 10/101* | (2012.01) |
| *F02B 47/02* | (2006.01) |
| *F02M 25/022* | (2006.01) |
| *F02M 25/025* | (2006.01) |

(52) U.S. Cl.
CPC ........ *B60W 30/1882* (2013.01); *B60W 10/06* (2013.01); *B60W 10/101* (2013.01); *F02B 47/02* (2013.01); *F02M 25/025* (2013.01); *F02M 25/0227* (2013.01); *B60W 2710/1005* (2013.01)

(58) Field of Classification Search
CPC .... F02M 25/025; F02M 25/028; F02M 25/03; F02M 25/0227; F02B 47/02; B60W 10/06; B60W 10/10; B60W 10/101; B60W 30/1882; B60W 30/18
See application file for complete search history.

(56) References Cited

U.S. PATENT DOCUMENTS

| | | |
|---|---|---|
| 4,505,169 A | 3/1985 | Ganoung |
| 5,148,776 A | 9/1992 | Connor |
| 7,581,528 B2 | 9/2009 | Stein et al. |
| 7,748,481 B2 | 7/2010 | Holmes et al. |
| 8,050,831 B2 | 11/2011 | Martin et al. |
| 8,096,283 B2 | 1/2012 | Surnilla et al. |
| 8,606,474 B2 | 12/2013 | Guo et al. |

(Continued)

OTHER PUBLICATIONS

Boeriu, Horatiu, "BMW 1 Series with Direct Water Injection—First Drive," http://www.bmwblog.com/201/07/02/bmw-1-series-with-direct-water-injection-first-drive, Update Jul. 2, 2015, 12 pages.

(Continued)

*Primary Examiner* — Erin D Bishop
(74) *Attorney, Agent, or Firm* — Julia Voutyras; McCoy Russell LLP (57) ABSTRACT

Methods and systems are provided for integrating engine water injection technology with a CVT transmission. Responsive to a driver demand, a controller may determine whether to maintain a current water injection state or transition to an alternate water injection state based on each of the efficiency of the transition, water availability, and any engine limitations that may be incurred at the engine speed-load following the transition. To improve the net fuel economy benefit while addressing the engine limitation, the water injection state transition may be combined with a CVT adjusted engine speed-load regime, while maintaining engine power output.

20 Claims, 5 Drawing Sheets

(56) References Cited

U.S. PATENT DOCUMENTS

| | | | |
|---|---|---|---|
| 8,738,255 | B2 | 5/2014 | Carter et al. |
| 8,870,709 | B2 | 10/2014 | Shelton et al. |
| 9,067,587 | B1 | 6/2015 | Johri et al. |
| 10,059,325 | B2* | 8/2018 | Leone .................... B60W 20/11 |
| 2008/0202454 | A1 | 8/2008 | Pirault |
| 2010/0121559 | A1 | 5/2010 | Bromberg et al. |
| 2011/0029177 | A1 | 2/2011 | Yeung et al. |
| 2011/0174267 | A1 | 7/2011 | Surnilla et al. |
| 2013/0297162 | A1 | 11/2013 | Dai et al. |
| 2014/0366508 | A1* | 12/2014 | Ulrey ........................ F01N 3/04 60/274 |
| 2015/0047607 | A1 | 2/2015 | Glugla et al. |

OTHER PUBLICATIONS

Thewes, Matthias, et al., "Water Injection for Gasoline Combustion Systems," Efficient Engines, ATZ Live, vol. 76, pp. 10-15, 2012, 6 pages.
Bosch, Robert, "Ford GPTF: Water Injection," Gasoline Systems Presentation, Nov. 18, 2015, 15 pages.
Miller, Kenneth James, et al., "Method and System for Engine Control," U.S. Appl. No. 15/146,687, filed May 4, 2016, 54 pages.
Miller, Kenneth James, et al., "Method and System for Engine Control," U.S. Appl. No. 15/146,784, filed May 4, 2016, 47 pages.
Miller, Kenneth James, et al., "Method and System for Engine Control," U.S. Appl. No. 15/146,809, filed May 4, 2016, 52 pages.
Miller, Kenneth James, et al., "Method and System for Engine Control," U.S. Appl. No. 15/146,822, filed May 4, 2016, 47 pages.
Leone, Thomas G., et al., "Method and System for Controlling Water Injection," U.S. Appl. No. 15/216,525, filed Jul. 21, 2016, 63 pages.

\* cited by examiner

METHOD AND SYSTEM FOR CONTROLLING WATER INJECTION

FIELD

The present description relates generally to methods and systems for controlling water usage of an engine coupled with a continuously variable transmission (CVT).

BACKGROUND/SUMMARY

Internal combustion engines may include water injection systems that inject water into a plurality of locations, such as into an intake manifold, upstream of engine cylinders, or directly into engine cylinders. Engine water injection provides various benefits such as an increase fuel economy and engine performance, as well as a decrease in engine emissions. In particular, when water is injected into the engine intake or cylinders, heat is transferred from the intake air and/or engine components to evaporate the water, leading to charge cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, improved wide-open throttle performance, and decreased exhaust temperature. As a result, fuel efficiency is increased. Additionally, greater volumetric efficiency may lead to increased torque. Furthermore, lowered combustion temperature with water injection may reduce NOx emissions, while a more efficient fuel mixture (less enrichment) may reduce carbon monoxide and hydrocarbon emissions.

Engine control systems may select when to use water injection based on engine operating conditions, such as engine knock limitations. One example approach is shown by Surnilla et al. in U.S. Pat. No. 8,096,283. Therein, water usage is based on water availability, knock limits, dilution requirements, and spark constraints. Another example approach is shown by Connor in U.S. Pat. No. 5,148,776. Therein water usage is adjusted based on the amount of cooling required to overcome premature ignition of an air-fuel mixture engine cylinders.

However the inventors herein have recognized potential issues with such approaches. As one example, the optimal fuel economy gain associated with water usage may not be realized due to the fixed gear ratio of the transmission. In particular, at a given driver demand, based on whether water is being injected or not, there may be an associated fixed engine speed and load range that meets the driver demand. An engine controller may use water injection based on water availability on-board the vehicle. However, when transitioning between operating with or without water injection, there may be engine limitations experienced at the associated engine speed-load that may reduce the fuel economy benefit of the transition. As an example, when water injection is not being used, the engine may become more knock-limited at high loads. Consequently, the optimum engine speed-load for the driver demand may be different from that when water injection is used. Another issue is that frequent changes in operator pedal demand may cause the engine load to move back and forth, leading to frequent switching on and off of water injection. Excessive switches can degrade fuel economy due to losses incurred during transitions, and may degrade the life of the parts, and may cause air-fuel disturbances that move away from ideal stoichiometry.

The inventors herein have recognized that the fuel economy benefits of an engine configured with water injection may be better leveraged through integration with a continuously variable transmission (CVT). In particular, the CVT may enable the engine speed and load to be adjusted based on water usage (and availability) while maintaining the power output of the engine. In one example, fuel economy may be improved by a method for an engine configured with water injection, the engine coupled with a continuously variable transmission (CVT), the method comprising: for a driver demanded power level, comparing fuel economy without water injection to fuel economy with water injection at a first adjusted engine speed-load; and in response to a higher than threshold improvement in the fuel economy with water injection at the adjusted engine speed-load, injecting an amount of water into the engine and changing to the first adjusted engine speed-load via the continuously variable transmission (CVT). In this way, an engine can be operated with water injection while providing an improved fuel economy for a given driver demand by increasing the maximum load that can be achieved without knocking, or in other words, by increasing the knock limit.

As one example, an engine may be configured with a water injection system that enables water to be injected into an intake manifold, into an intake port, or directly into an engine cylinder. Based on water availability (such as in a dedicated water tank), the water injection system may be in an active state (with water injection enabled) or an inactive state (with water injection disabled). At any given driver demand, the controller may be configured to compare the fuel efficiency versus power for each water injection state. The effects of knock limits associated with each water injection state are included in an efficiency versus power data included in the controller memory. If the current water injection state is not the more efficient state, the controller may predict if there are any limitations, such as knock limitations, associated with the corresponding engine speed-load. If so, the controller may further determine if the engine speed-load can be changed while maintaining the current water injection state and while maintaining the demanded engine power output, and any fuel penalties associated therewith. In other words, the controller may determine whether the optimum engine speed-load with the more cost efficient water injection state is different from the current engine speed-load. As the driver demand changes, if the efficiency of the current water injection state drops (e.g., by more than a threshold amount) below the efficiency of the other water injection state, the water injection state is switched. Else, the current water injection state is maintained. In particular, if the engine speed-load can be changed while maintaining usage of the current water injection state with a net fuel economy improvement, the controller may maintain the current water injection state and shift to the optimum speed-load range for the selected state. Else, the engine may switch to the other water injection state and shift to the optimum speed-load range for that state. As an example, when operating with water injection inactive, the engine may be knock limited at lower loads than when water injection is active. Therefore, to address knock anticipated while operating without water injection, an engine controller may need to actuate the CVT to increase the engine speed while decreasing the engine load so as to maintain the demanded engine power output, which may or may not provide a net cost benefit. Likewise, when operating with water injection active, the CVT may be actuated to lower the engine speed (relative to the previous engine speed when water injection was inactive) while load is increased (as compared to the previous load when water injection was inactive) which may provide a net cost benefit. Because the quantity of water is limited in the reservoir, the controller aims to only use the water when a pre-determined improvement in fuel efficiency will occur, so it only injects the water and adjusts the speed-load, when the "water" efficiency improvement exceeds a threshold over the non-water speed-load efficiency.

In this way, fuel economy benefits can be improved. The technical effect of integrating water injection technology in a vehicle having a CVT transmission is that for a given driver demanded power, the benefits of the water injection can be better leveraged. In particular, the engine speed and torque for a given driver demanded power can be adjusted to reduce knock limitations at higher loads to increase the maximum load, and reduce friction losses at lower loads, while accounting for changes in knock limits due to water injection properties. The technical effect of assessing the fuel economy benefit of switching water injection states with the fuel penalty associated with operating at the engine speed-load profile corresponding to a selected water injection state is that frequent switching between water injection states can be reduced. While operating the engine with the more efficient and cost-effective water injection state, CVT adjustments can be used to extend engine operation with water injection despite changes in driver or wheel torque demand, and for conditions where the benefit of water injection is small, CVT adjustments can be used to extend engine operation without water injection despite changes in driver or wheel torque demand. By optimizing water usage, the benefits of water injection can be extended over a longer portion of a drive cycle, even when water availability is limited.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
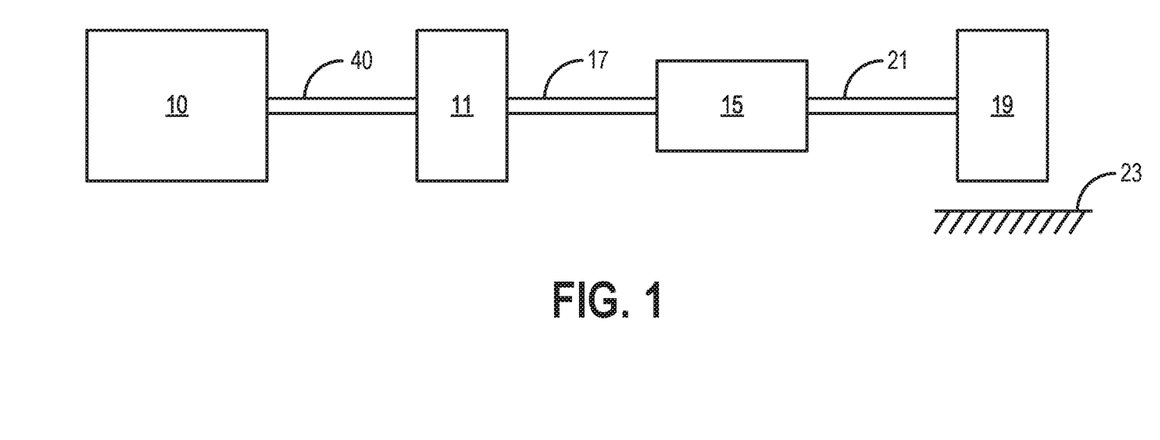
FIG. 1 illustrates an example vehicle powertrain.

The following description relates to systems and methods for improving fuel economy in a vehicle having a continuously variable transmission (herein also referred to as a CVT), such as the powertrain of FIG. 1. The vehicle may include an engine system configured for water injection, as described with reference to the engine system of FIG. 2. A controller may be configured to perform a control routine, such as the example routine of FIG. 3, to select a water injection state (active or inactive) based on water availability while adjusting an engine speed-load profile via adjustments to a speed ratio of the CVT to better leverage the fuel economy benefits of water injection. An example map that may be used by the controller to select whether to maintain or transition between water injection states is shown with reference to FIG. 4. An example engine operation with water usage and CVT adjustments is shown at FIG. 5. In this way, water injection technology can be integrated and synergized with CVT technology to achieve significant fuel economy improvements.

Figure 2:
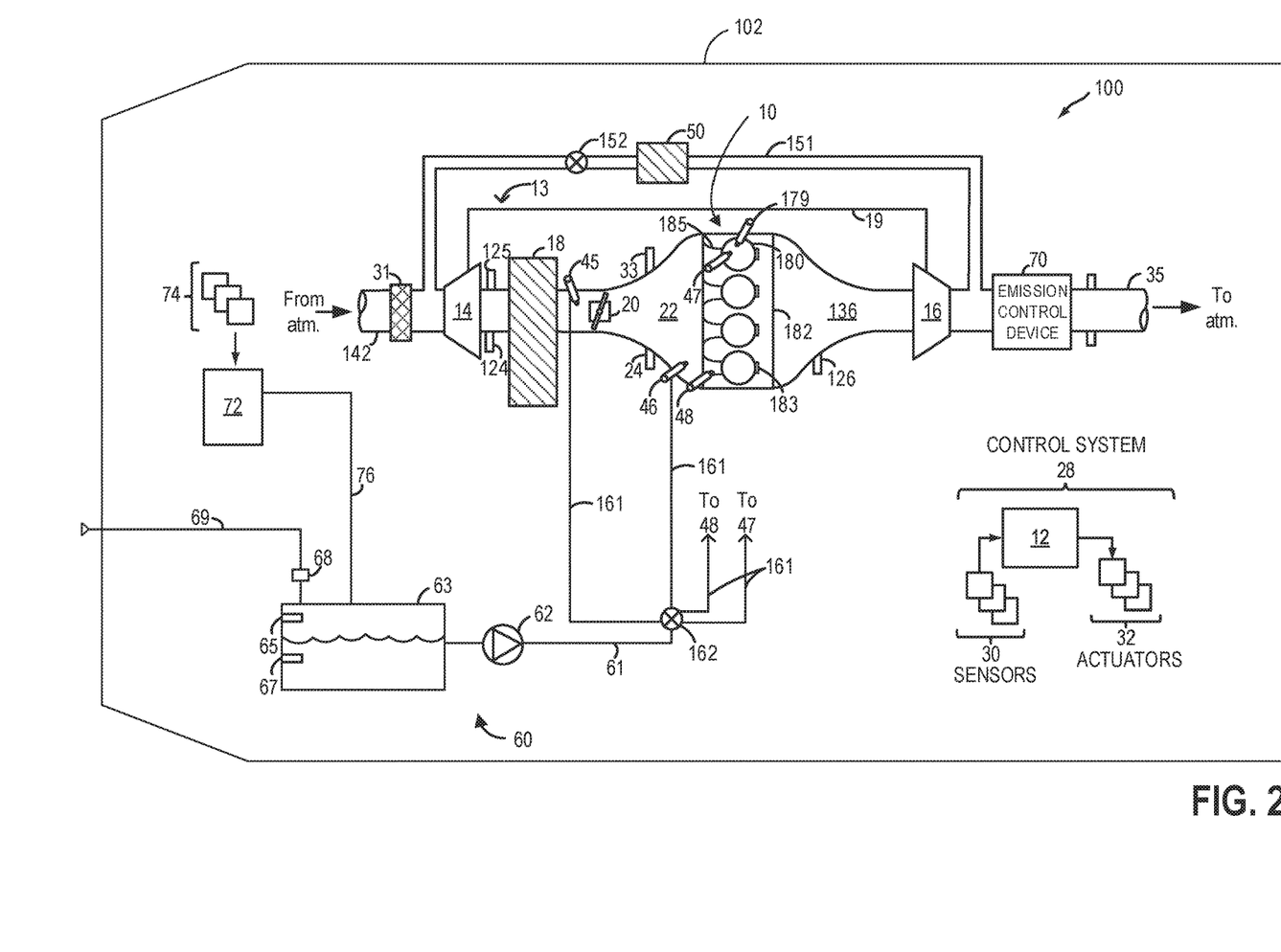
FIG. 2 shows a schematic diagram of an engine system including a water injection system.

Referring to FIG. 1, internal combustion engine 10, further described herein with particular reference to FIG. 2, is shown coupled to torque converter 11 via crankshaft 40. Engine 10 may be configured to operate on gasoline fuel, ethanol fuel, fuel bends, diesel fuel, etc. As elaborated at FIG. 2, engine 10 may be configured with water injection capabilities. Torque converter 11 is also coupled to transmission 15 via turbine shaft 17. In one embodiment, transmission 15 comprises an electronically controlled transmission with a plurality of selectable speed ratios. Transmission 15 may also comprise various other gears, such as, for example, a final drive ratio (not shown). In the depicted example, transmission 15 is a continuously variable transmission (CVT). The CVT may be an automatic transmission that can change seamlessly through a continuous range of effective speed ratios, in contrast with other mechanical transmissions that offer a finite number of fixed gear ratios (speed ratios). The speed ratio flexibility of the CVT allows the input shaft to maintain a more optimized angular velocity. As elaborated with reference to FIG. 3, by adjusting a speed ratio of the CVT, an engine controller may be configured to vary an engine speed-load profile while maintaining a demanded power output of the engine. For example, an engine speed may be lowered while an engine load is correspondingly increased to maintain a power output by adjusting the CVT to a lower speed ratio. As another example, an engine speed may be raised while an engine load is correspondingly decreased to maintain a power output by adjusting the CVT to a higher speed ratio. This enables fuel economy benefits of operating an engine with water injection to be better leveraged.

Torque converter 11 has a bypass clutch (not shown) which can be engaged, disengaged, or partially engaged. When the clutch is either disengaged or being disengaged, the torque converter is said to be in an unlocked state. Turbine shaft 17 is also known as a transmission input shaft.

Transmission 15 may further be coupled to tire 19 via axle 21. Tire 19 interfaces the vehicle (not shown) to the road 23. Note that in one example embodiment, this powertrain is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

FIG. 2 shows an example embodiment of an engine system 100 configured with a water injection system 60. Engine system 100 is coupled in motor vehicle 102, illustrated schematically. Engine system 100 includes an engine 10, which may include engine 10 of FIG. 1. In the depicted embodiment, engine 10 is a boosted engine coupled to a turbocharger 13 including a compressor 14 driven by a turbine 16. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the intake manifold 22. In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Intake manifold 22 is coupled to a series of combustion chambers or cylinders 180 through a series of intake valves (not shown) and intake runners (e.g., intake ports) 185. As shown in FIG. 1, the intake manifold 22 is arranged upstream of all combustion chambers 180 of engine 10. Additional sensors, such as manifold charge temperature (MCT) sensor 33 and air charge temperature sensor (ACT) 125 may be included to determine the temperature of intake air at the respective locations in the intake passage. The air temperature may be further used in conjunction with an engine coolant temperature to compute the amount of fuel that is delivered to the engine, for example. Each combustion chamber may further include a knock sensor 183 for identifying and differentiating abnormal combustion events, such as knock and pre-ignition. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 2, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 2, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 16. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 16 to downstream of the compressor 14. In some embodiments, the MCT sensor 23 may be positioned to determine the manifold charge temperature, and may include air and exhaust recirculated through the EGR passage 151.

Combustion chamber 180 also receives water and/or water vapor via water injection system 60. Water from water injection system 60 may be injected into the engine intake or directly into the combustion chambers 180 by one or more of water injectors 45-48. As one example, water may be injected into intake manifold 22, upstream of throttle 20, via water injector 45, herein also referred to as central water injection. As another example, water may be injected into intake manifold 22, downstream of the throttle, via water injector 46. As yet another example, water may be injected into one or more intake runners (e.g., intake ports) 185 via water injector 48 (herein also referred to as port water injection), and/or directly into combustion chamber 180 via water injector 47 (herein also referred to as direct water injection). In one embodiment, injector 48 arranged in the intake runners may be angled toward and facing the intake valve of the cylinder which the intake runner is attached to. As a result, injector 48 may inject water directly onto the intake valve, resulting in faster evaporation of the injected water and a higher dilution benefit from the water vapor. In another embodiment, injector 48 may be angled away from the intake valve and arranged to inject water against the intake air flow direction through the intake runner. As a result, more of the injected water may be entrained into the air stream, thereby increasing the charge cooling benefit of the water injection.

Though only one representative injector 47 and injector 48 are shown in FIG. 1, each combustion chamber 180 and intake runner 185 may include its own injector. In alternate embodiments, water injection system 60 may include water injectors positioned at one or more of these positions. For example, the engine may include only water injector 46, in one embodiment. In another embodiment, the engine may include each of water injector 46, water injectors 48 (one at each intake runner), and water injectors 47 (one at each combustion chamber).

Water injection system 60 includes a water storage tank 63, a water lift pump 62, a collection system 72, and a water filling passage 69. Water stored in water tank 63 is delivered to water injectors 45-48 via water passage 61 and conduits 161. In embodiments that include multiple injectors, water passage 61 may contain a valve 162 (e.g., diverter valve, multi-way valve, proportioning valve, etc.) to direct water to the different water injectors via the corresponding conduits. Alternatively, each conduit 161 may include respective valves within the water injectors 45-48, for adjusting water flow there-through. In addition to water lift pump 62, one or more additional pumps may be provided in conduits 161 for pressurizing the water directed to the injectors, such as in the conduit coupled to direct water injector 47.

Water storage tank 63 may include a water level sensor 65 and a water temperature sensor 67, which may relay information regarding water conditions to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. If the level of water in the water tank 63 is higher than a threshold level, it may be inferred that there is sufficient water available for injection, and accordingly water injection may be enabled by the controller. Else, if the level of water in the water tank 63 is lower than the threshold level, it may be inferred that there is insufficient water available for injection, and therefore water injection may be disabled by the controller.

In the depicted embodiment, water storage tank 63 may be manually refilled via water filling passage 69 and/or refilled automatically by the collection system 72 via water tank filling passage 76. Collection system 72 may be coupled to one or more vehicle components 74 so that the water storage tank can be refilled on-board the vehicle with condensate collected from various engine or vehicle systems. In one example, collection system 72 may be coupled with an EGR system to collect water condensed from exhaust passing through the EGR system. In another example, collection system 72 may be coupled with an air conditioning system (not shown) for collected water condensed from refrigerant passing through a condenser. Manual filling passage 69 may be fluidically coupled to a filter 68, which may remove small impurities contained in the water.

FIG. 2 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIGS. 1-2, to receive input including transmission gear position, accelerator pedal position, brake demand, vehicle speed, engine speed, mass airflow through the engine, boost pressure, ambient conditions (temperature, pressure, humidity), etc. Other sensors include CAC 18 sensors, such as CAC inlet air temperature, ACT sensor 125 and pressure sensor 124, CAC outlet air temperature sensor, and MCT sensor 23, knock sensor 183 for determining ignition of end gases and/or water distribution among cylinders, and others. The controller 12 receives signals from the various sensors of FIGS. 1-2 and employs the various actuators of FIGS. 1-2 to adjust engine operation based on the received signals and instructions stored on a memory of the controller. For example, injecting water to the engine may include adjusting a pulse-width of injectors 45-48 to vary an amount of water injected while also adjusting a timing of the water injection and a number of injection pulses. In some examples, the storage medium may be programmed with computer readable data representing instructions executable by the processor for performing the methods described below (e.g., at FIG. 3) as well as other variants that are anticipated but not specifically listed.

In this way, the system of FIGS. 1-2 enables a vehicle system comprising: an engine; a fuel injector for delivering fuel from a fuel tank to the engine; a water injector for delivering water from a water reservoir to the engine; a continuously variable transmission (CVT) coupling the engine to vehicle wheels, the CVT having a plurality of speed ratios; and a controller. The controller may be configured with computer readable instructions stored on non-transitory memory for: estimating a first efficiency associated with operating the engine with the water injector deactivated and a second efficiency associated with operating the engine with a first modified engine speed-load profile and the water injector activated; if the second efficiency is higher than the first efficiency, and a water level in the water reservoir is higher than a threshold, activating the water injector while selecting one of the plurality of speed ratios of the CVT to provide the first modified engine speed-load profile; and if the second efficiency is lower than the first efficiency, or the water level in the water reservoir is lower than the threshold, deactivating the water injector while selecting another one of the plurality of speed ratios of the CVT to provide a second modified engine speed-load profile, different from the first modified engine speed-load profile. In the preceding example, additionally or optionally, the first modified engine speed-load profile is based on an engine knock limit and engine friction when operating with water injection, wherein the second modified engine speed-load profile is based on an engine knock limit and engine friction when operating without water injection, and wherein the first modified engine speed-load profile has a lower engine speed and a higher engine load than the second modified engine speed-load profile.

Figure 3:
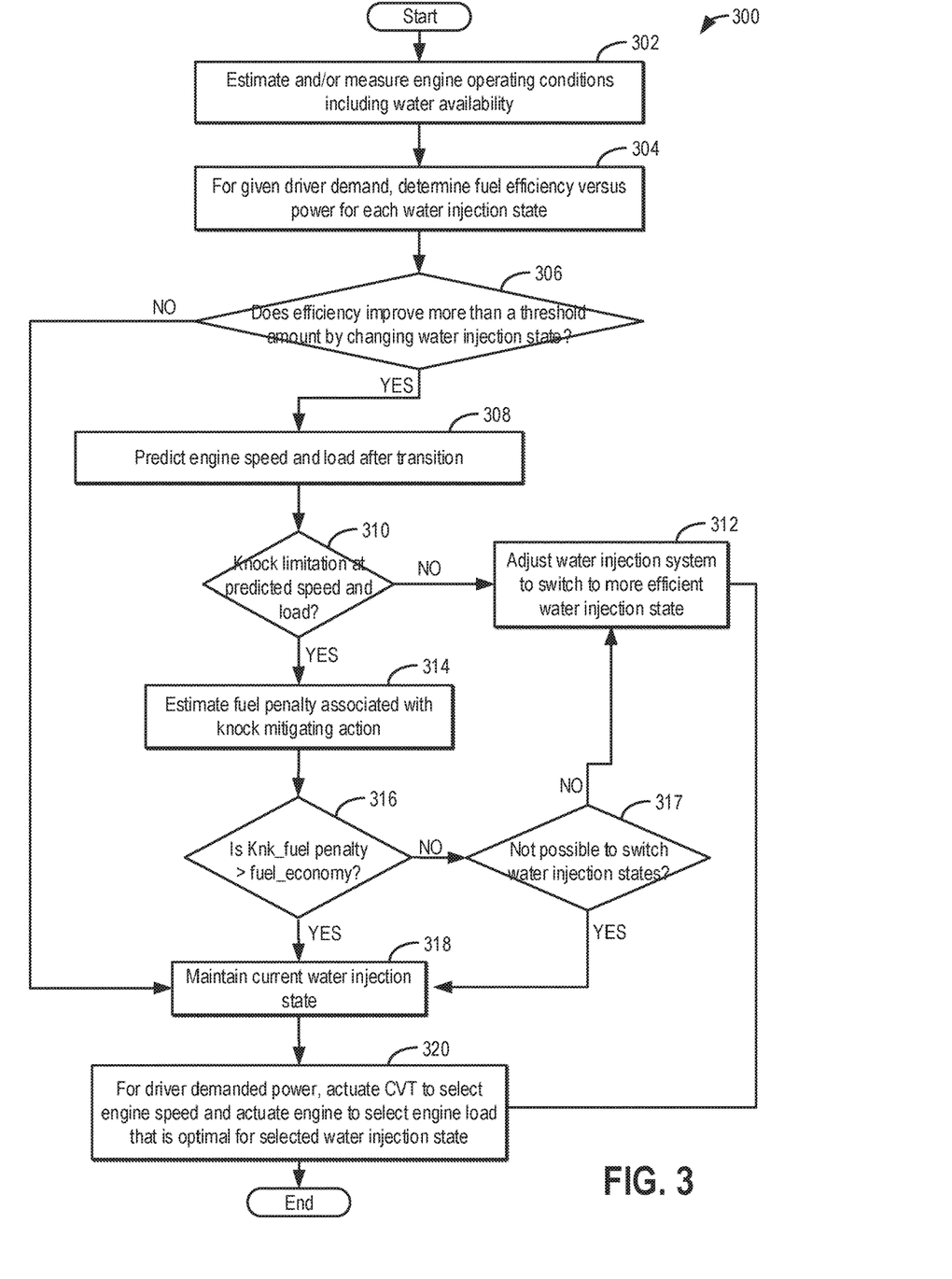
FIG. 3 shows a high level flow chart for selecting a water injection state for use in the engine system of FIG. 1 based on concurrent adjustments to an engine speed-load profile via a continuously variable transmission.

Now turning to FIG. 3, an example routine 300 is described for coordinating adjustments to selection of a water injection state in an engine with adjustments to a speed ratio of a continuously variable transmission (CVT). In this way, a powertrain profile of the engine (including engine speed and load) can be adjusted while maintaining a demanded power output of the engine and while leveraging the charge cooling effects properties (such as octane rating and knock mitigating ability) fuel economy benefits from each of the water injection and the CVT adjustment. The method enables improvements in fuel economy despite frequent changes in driver power demand. Instructions for carrying out method 300 as well the other methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring engine operating conditions. These may include, for example, driver power demand (such as based on output of a pedal position sensor coupled to an operator pedal and a measured vehicle speed), ambient temperature, pressure and humidity, engine temperature, fuel level in a fuel tank, water level in the water tank, fuel octane, manifold pressure (MAP), manifold air flow (MAF), catalyst temperature, intake temperature, boost level, etc.

At 304, the method includes, for the given driver power demand, comparing the efficiency of the given fuel of the engine in each water injection state. The different water injection states include an active water injection state wherein water injection is enabled and water is injected into the engine (such as into the cylinder, into the intake port, or into the intake manifold), and a deactivated water injection state wherein water injection is disabled. As such, the active water injection state may be enabled only if there is sufficient water in the water tank. As one example, the fuel efficiency of the engine with water injection enabled may be compared to the fuel efficiency of the engine with water injection disabled.

In embodiments where there are multiple water injector options, the fuel efficiency with each of the various water injection options (such as direct injection, port injection, and central injection of water) may be compared. For example, the fuel efficiency of engine operation without water injection may be compared to the efficiency of injecting water directly into an engine cylinder via a direct water injector, and to injecting water into an intake port upstream of an intake valve via a port water injector, and also to injecting water into an intake manifold, upstream or downstream of an intake throttle, via a central water injector.

As used herein, the fuel efficiency of the engine may be defined as the amount of work generated for a given amount of fuel in each water injection state, where a commonly used metric in the art, is BSFC for brake specific fuel consumption. In one example, the controller may compare the fuel efficiency of the two water injection states by comparing the brake specific fuel consumption (BSFC) of the engine for each state. The BSFC of the engine in each water injection state may be stored in tables, maps, and/or equations as a function of operating conditions such as RPM, load, torque, temperature, humidity, fuel octane, etc. In particular, for the driver demand, the controller may determine the BSFC of the engine with water injection disabled and then determine the efficiency as the inverse of the BSFC. Then the controller may determine an amount of water required to be injected, and calculate the fuel efficiency with water injection enabled (including the fuel efficiency with the determined amount of water being provided via direct injection, port injection, and/or central injection), and determine the efficiency as the inverse of the BSFC.

At 306, the method includes determining if the efficiency of the engine improves by more than a threshold amount by changing the water injection state from the current state the engine is in to the other state. For example, the engine may be currently operating with water injection disabled and in response to a change in the driver demand, it may be determined if the fuel efficiency of the engine improves by more than a threshold amount by transitioning to operating with water injection enabled. In another example, the engine may be currently operating with water injection enabled and in response to a change in the driver demand, it may be determined if the fuel efficiency of the engine improves by more than a threshold amount by transitioning to operating with water injection disabled. As such, the controller may select the water injection state that provides the lower BFSC as the more efficient state.

If the efficiency of the engine does not improve by more than the threshold amount, then at 318, the method includes maintaining the current water injection state of the engine. Herein, if water injection was already enabled, the water injector is maintained activated. Optionally, CVT adjustments may be used to adjust the engine speed-load profile while in the current water injection state to achieve additional fuel economy benefits. For example, if the current state includes water injection being enabled, the engine speed may be lowered while the engine load is raised to reduce friction losses at low loads while in the current fuel and while maintaining a demanded power level of the engine. Alternatively, when the current state is water, the threshold could be negative, so that the water turns off when the fuel benefit of water still exists but is very small. This would save the water for future higher fuel efficiency benefit events.

If the efficiency of the engine improves by more than the threshold amount (based on the fuel efficiency comparison at 304), then at 308, the method includes predicting the engine speed speed and load after the transition to the alternate water injection state. In particular, to maintain the power output responsive to the driver demand, the switch in water injection state may result in a different engine speed-load profile. For example, for a given driver demand, the engine may provide the same power output by operating with a lower engine speed and higher engine load with water injection activated or with a higher engine speed and lower engine load with water injection deactivated.

At 310, it may be determined if any engine operating limitations are expected at the predicted engine speed-load for the more efficient water injection state. These may include, for example, knock limitations, or frictional losses. For example, it may be determined if knock is likely to occur at the predicted engine speed-load.

If knock is not expected at the predicted engine speed-load, then at 312, the method includes transitioning the engine to the alternate water injection state. In one example, where the alternate water injection state includes water injection being deactivated, in response to knock not being expected, the controller may send a signal to an actuator coupled to the water injector delivering the water to the engine to deactivate/disable the water injector. As another example, where the alternate water injection state includes water injection being activated, in response to knock not being expected, the controller may send a signal to the actuator coupled to the water injector delivering the water to the engine to activate/enable the water injector The routine may then move to 320 wherein the controller adjusts the CVT to provide the engine speed-load profile that is optimal for the selected water injection state. For example, the CVT may be adjusted to a lower speed ratio responsive to a transition to the water injection active state, thereby lowering the engine speed. As another example, the CVT may be adjusted to a higher speed ratio responsive to a transition out of the water injection state, thereby raising the engine speed.

In addition to actuating the CVT, the controller may also actuate one or more of the engine intake throttle, intake and/or exhaust cams, valve lift, boost pressure, and spark timing to deliver the optimal load and torque for the selected fuel.

Returning to 310, if knock is expected at the predicted engine speed-load, then at 314, the method includes predicting a fuel penalty associated with a knock mitigating adjustment. For example, it may be determined if the engine speed-load profile can be modified (via adjustments to a speed ratio of the CVT) to reduce the knock. Adjusting to the adjusted/modified engine speed-load profile may include selecting a speed ratio of the CVT that matches the adjusted engine speed-load profile. This may include selecting a speed ratio that raises the engine speed while lowering the engine load while in the water deactivated state to maintain the power output of the engine while reducing knock. This is because when water water injection is not used, the engine becomes more knock limited at higher engine loads. In another example, the engine speed may be increased while the engine load is decreased as engine operation in the water deactivated state approaches the knock limit. As such, the inventors have recognized that the engine speed-load profile may be varied while maintaining the engine power output via adjustments to a speed ratio of the CVT. Then, the fuel efficiency of the engine in the new engine speed-load profile and the selected water injection state may be calculated (in the present example, the fuel efficiency at the higher speed and lower load of the higher octane fuel).

In one example, the controller may refer to a map to determine if the change in engine speed-load results in transition of the engine from a first line (or island) of best efficiency to a second, different line (or island) of best efficiency, the second line having a lower efficiency as compared to the first line. Herein, a fuel penalty may be estimated based on a drop in the efficiency (e.g., based on a difference between the efficiency at the first line relative to the second line). With reference to the above-described example, a first efficiency of the engine with water injection deactivated with the default lower engine speed and higher engine load may be compared to a second efficiency with water injection activated with the CVT-adjusted higher engine speed and lower engine load. In an alternate example, an amount of spark retard required to mitigate the knock may be determined and the corresponding fuel penalty may be computed.

At 316, the predicted fuel penalty associated with knock (Knk_fuel penalty) may be compared to the fuel economy change associated with the transition to the selected water injection state (Fuel_economy). In other words, a fuel economy associated with operating the engine at the current water injection state is compared to the fuel economy change associated with operating the engine at the alternate water injection state with the modified engine speed-load profile. Herein, the engine may be operated at the current water injection state with either a default engine speed-load profile or a modified speed-load profile modified based on engine limitations at the current water injection state (which may be the same as or different from the engine limitations at the alternate fuel). Thus, the modified speed-load profile at the current water injection state may be different from the modified speed-load profile at the alternate water injection state. For example, the modified speed-load profile at the current water injection state may be adjusted for friction losses while the modified speed-load profile at the alternate water injection state may be adjusted for knock limitations. However, a power level of the engine is maintained at each mode of engine operation (with default or modified speed-load profile).

If the fuel penalty is lower than the fuel economy change due to the water injection transition, that is, the net result even with the change in engine speed-load profile and the water state transition is a net benefit, then the method moves to 317 to determine if there are any reasons why it may not be possible to switch to the alternate water injection state. In one example, the current water injection state includes water injection being inactive, the alternate water injection state includes the water injection being active, wherein it may not be possible to switch the alternate water injection state due to a water level in a water tank of the water injection system being lower than a threshold level (or due to the amount of water available being less than the water desired to be injected). As another example, it may not be possible to transition to the alternate water injection state due to a water injection system component being degraded (e.g., degraded water injector, degraded water pump, etc.).

If it is possible to switch to the alternate state, then at 312, the method proceeds to transition the engine to the water injection state with the higher efficiency via adjustments to the corresponding injectors. In addition, at 320, the controller may adjust the CVT and engine to provide the engine speed-load profile that is optimal for the selected water injection state and for addressing the given knock limitations. For example, the engine may be transitioned to the water injection activated state while the CVT is adjusted to a speed ratio that lowers the engine speed and the engine simultaneously raises the engine load while maintaining the same powertrain output power.

If it is not possible to switch to the alternate state, then at 318, the method proceeds to maintain the current water injection state in the engine. Thus, even though the other water injection state is more fuel efficient for the given driver demand, the controller may maintain the engine in the current water injection state in view of the inability to provide the requested water injection due to water injection system limitations. In addition, at 320, the controller may adjust the CVT to provide the engine speed-load profile that is optimal for the current water injection state. This may include maintaining a default engine speed-load profile while maintaining the current water injection state, or adjusting the engine speed-load profile for the current water injection state via adjustments to the CVT speed ratio.

Returning to 316, if the fuel penalty is higher than the fuel economy change due to the transition, that is, the net result even with the change in engine speed-load profile and the water injection transition is a fuel loss, then the method moves to 318 to maintain the current water injection state in the engine. Thus, even though the other water injection state may be nominally more fuel efficient for the given driver demand, the controller may maintain the engine in the current water injection state in view of limitations that may be experienced when operating at the other water injection state. In addition, at 320, the controller may adjust the CVT to provide the engine speed-load profile that is optimal for the selected water injection state. This may include maintaining a default engine speed-load profile while maintaining the current water injection state. Alternatively, this may include adjusting the engine speed-load profile for the current water injection state via adjustments to the CVT speed ratio while maintaining the current water injection state.

It will be appreciated that while the above method discusses predicting knock limitations at the predicted engine speed-load at 310, and predicting a knock mitigating fuel penalty at 314, this is not meant to be limiting. In an alternate example, the controller may predict frictional losses at the predicted engine speed-load and then predict a friction mitigating fuel penalty. For example, during selected conditions, friction may be traded for knock constraints.

In this way, for a power level, the controller may compare the fuel economy without water injection to fuel economy with water injection at an adjusted engine speed-load. Then, in response to a higher than threshold improvement in the fuel economy with water injection at the adjusted engine speed-load, the controller may transition to injecting an amount of water into the engine and changing to the adjusted engine speed-load. Else, in response to the higher than threshold improvement in the fuel economy with water injection at the adjusted engine speed-load but a lower than threshold level of water in a water reservoir, the controller may maintain engine operation without water injection. As an example, after transitioning to the use of water injection, the engine may be shifted to a first adjusted engine speed load that is based on a knock limit of engine operation with water injection, whereas while maintaining engine operation without water injection, the engine may be shifted to a second adjusted engine speed-load, different from the first adjusted engine speed-load that is based on a knock limit of engine operation without water injection. In each case, a CVT speed ratio may be selected that matches the (first or second) adjusted engine speed-load. For example, the first adjusted engine speed-load may include a lower than default engine speed and a higher than default engine load while the second adjusted engine speed-load includes a higher than default engine speed and a lower than default engine load. Further, the engine speed of the first adjusted engine speed-load may be decreased and an engine load of the first adjusted engine speed-load may be increased to maintain the power level as the knock limit of engine operation with water injection is approached. In comparison, the engine speed of the second adjusted engine speed-load may be increased and the engine load of the second adjusted engine speed-load may be decreased to maintain the power level as the knock limit of engine operation without water injection is approached. It will be appreciated that the power level is maintained at each of engine operation without water injection and engine operation with water injection with the adjusted engine speed-load, wherein the power level includes a powertrain output of the engine determined as a product of engine load and engine speed.

Figure 4:
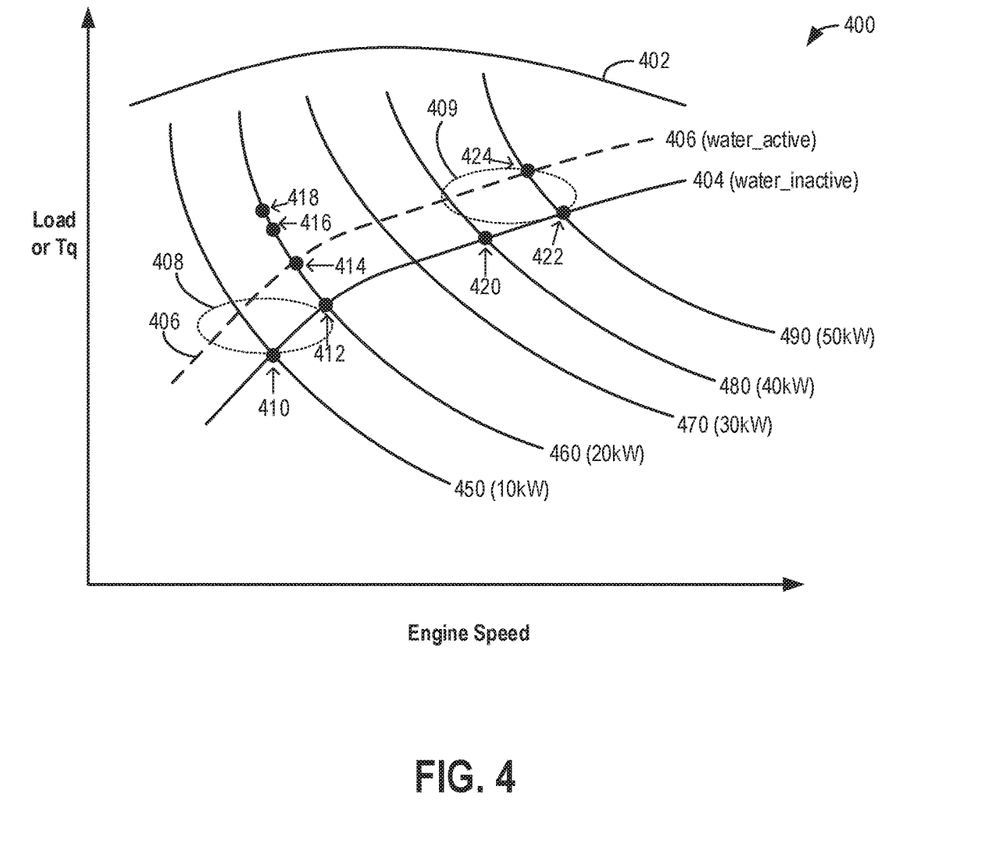
FIG. 4 shows an example map for selecting water usage.
Figure 5:
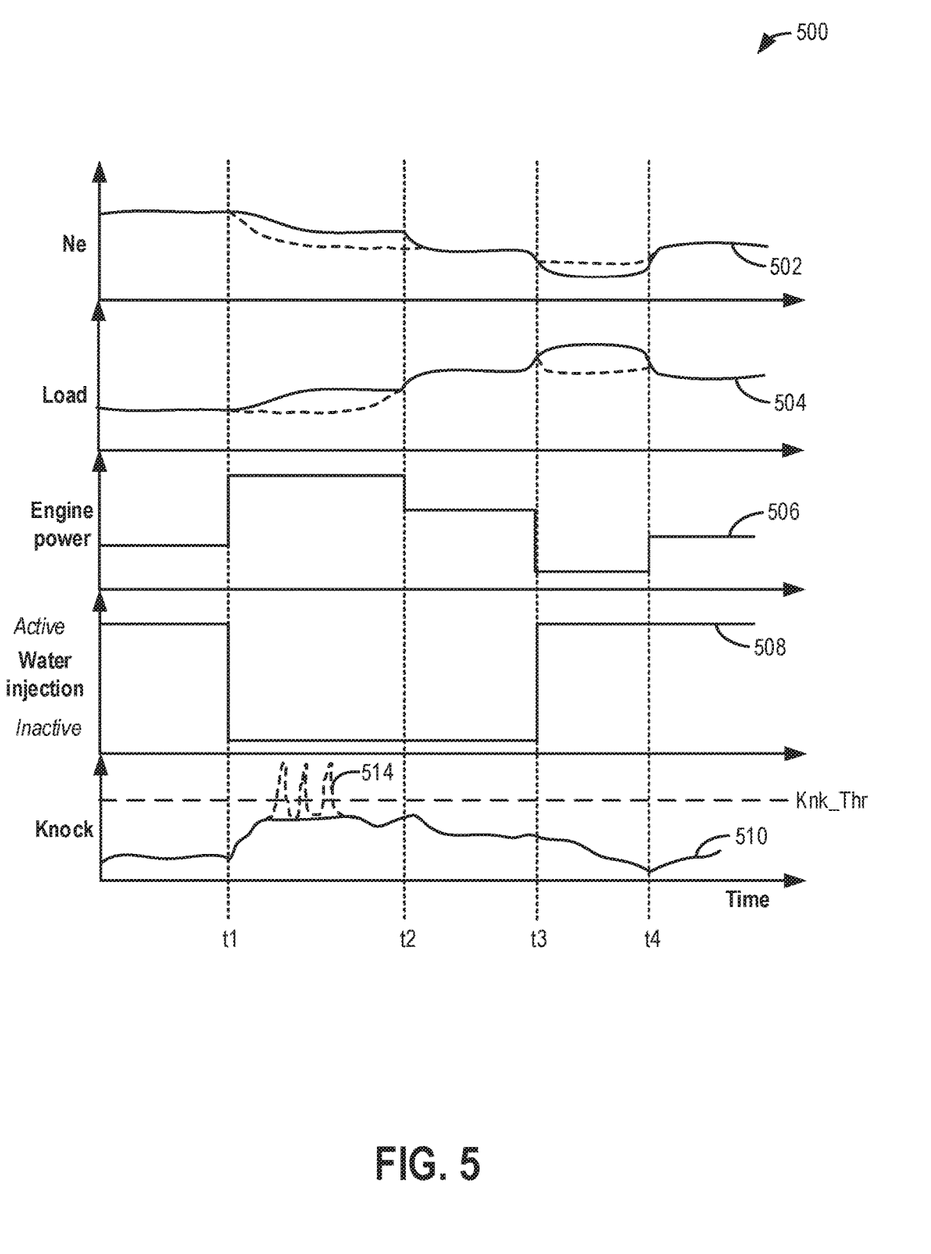
FIG. 5 shows example water usage and CVT adjustments during engine operation.

In one example, as elaborated with reference to FIG. 4, the data from fuel island data maps for each water injection state may be reduced to two best efficiency lines that the controller can more quickly interpolate between in real-time. Otherwise, the controller would have to run an optimization on each map, and then try to further optimize a point in-between the two water injection states. In the present approach, the controller may for use fuel island maps to pre-determine a line of optimal efficiency. Then, for the current power demand, the controller may look up lines of optimal efficiency for a current operating power and evaluate the two curves to determine optimal efficiency. The controller may interpolate linearly between the line of optimal efficiency for a water injection activated state and a water injection deactivated state. Although the line may not be exactly linear, the changes may be small enough that a linear approximation may be a reasonable real-time approximation.

Turning now to FIG. 4, an example map 400 is shown for comparing fuel efficiencies associated with different water injection states for a given driver demanded power output, as well as for comparing fuel efficiencies associated with different engine speed-load profiles for a given water injection state. In one example, the map of FIG. 4 may be generated during engine calibration and stored in the engine controller's memory. The controller may then reference the map during engine operation to determine whether to maintain usage of a current water injection state or transition to an alternate water injection state responsive to a change in driver demand.

Map 400 depicts a first line of best efficiency versus power with water injection disabled, herein also referred to as a first fuel optimum-efficiency load limit 404 (depicted as a solid line). Map 400 also depicts a second line of best efficiency versus power with water injection activated, herein also referred to as a second optimum-efficiency load limit 406 (depicted as a dashed line). The plots are shown with engine speed along the x-axis and engine load or torque along the y-axis. An example BSFC island (herein oval) of best fuel efficiency for the water injection disabled state is overlaid at dotted line 408, while a corresponding island for the water injection active state is overlaid at dotted line 409. It will be appreciated that islands 408 and 409 represent the innermost island of lowest fuel consumption and that fuel islands outer to this island are not shown herein for reasons of clarity. As such, the exact positions of the ovals of constant efficiency will change depending on current knock limits, which vary with fuel octane, temperature, humidity, and compression ratio. The maximum torque of the engine at a given engine speed is shown by curve 402. Lines of constant power output corresponding to 10 kW-50 kW are depicted at power lines 450-490, respectively.

A first adjustment is shown with reference to operating points 410-416. Based on a current driver demand, the engine may be at operating point 410 on the engine speed-load map. In particular, based on the engine load corresponding to a position on (or just below) first optimum-efficiency load limit 404, and a power demand of 10 kW, the engine may be operating at operating point 410 with water injection disabled and with an engine speed/load along power line 450. The engine speed-load at this point may be selected based on BSFC island 408.

If there is an increase in driver demand to 20 kW (such as due to an operator pedal tip-in while the engine is operating with water injection deactivated), the engine may transition to operating along power line 460 and determine whether to enable water injection based on changes in fuel efficiency. As a first option, the engine could be moved to operating point 412 along power line 460. Herein, the driver demand is provided while maintaining water injection disabled As a second option, the engine could be moved to operating point 414 along power line 460 where the same power output is provided while transitioning to operating with water injection enabled. As such, for the given driver demand, a higher fuel efficiency is provided by maintaining water injection disabled due to the engine operating on an island of higher fuel efficiency at point 414. However, the controller may further determine that operating point 414 is associated with a limitation (e.g., a knock limitation) which can be addressed by moving, as a third option, to operating point 416 where engine load is increased and engine speed is decreased while staying on power line 460. The engine speed-load adjustment may be performed via adjustments to a speed ratio for the CVT. Moving to operating point 416 would result in a drop in fuel economy (that is, incur a fuel penalty) relative to staying at operating point 414. However, the fuel penalty associated with the transition from operating point 414 to operating point 416 is smaller than the fuel improvement associated with the transition from operating point 412 to operating point 414. Consequently, in response to the increase in driver demand, it is more fuel efficient to move from operating point 410 to 416 by transitioning to operating with water injection enabled while decreasing the engine speed and lowering the engine load.

It will be appreciated that if the engine speed-load adjustment required to address the limitation moved the engine, as a fourth option, to operating point 418 (where the engine load is further increased and engine speed is further decreased while staying on power line 460), the move would incur a larger fuel penalty. In that case, the fuel penalty associated with the transition from operating point 414 to operating point 418 would be predicted to be larger than the fuel improvement associated with the transition from operating point 412 to operating point 414. Consequently, in response to the increase in driver demand, it would be more fuel efficient to move from operating point 410 to 414.

A second adjustment is shown with reference to operating points 420-424. Based on a current driver demand, the engine may be at operating point 420 on the engine speed-load map. In particular, based on the engine load corresponding to a position on (or just below) first optimum-efficiency load limit 404, and a power demand of 40 kW, the engine may be operating at operating point 420 with water injection disabled and with an engine speed/load along power line 480. The engine speed-load at the current water injection state may be selected based on BSFC island 409.

If there is an increase in driver demand to 50 kW (such as due to an operator pedal tip-in while the engine is operating with the higher octane fuel), the engine may transition to operate along power line 490 and determine whether to stay with water injection disabled or transition to activating water injection based on changes in fuel efficiency. As a first option, the engine could be moved to operating point 422 along power line 490. Herein, the driver demand is provided while maintaining the current water injection state (inactive). As a second option, the engine could be moved to operating point 424 along power line 490 where the same power output is provided while transitioning to the other water injection state (active). As such, for the given driver demand, a higher fuel efficiency is provided at the current water injection state, as determined based on a comparison of their BSFC islands. Consequently, in response to the increase in driver demand, it is more fuel efficient to move from operating point 420 to 424 by maintaining engine operation with water injection disabled. Additionally, further fuel economy benefits can be achieved via CVT adjustments. Specifically, a speed ratio of the CVT can be adjusted to move the engine to operating point 426 along power line 490 where the same power output is provided while maintaining water injection disabled, while decreasing the engine load and increasing the engine speed.

In this way, for a given driver demand, an engine controller may estimate a first fuel economy associated with maintaining a first water injection state where water injection is disabled to a second fuel economy associated with transitioning to a second water injection state where water injection is enabled while operating with a knock-adjusted engine speed-load profile. If the second fuel economy is higher than the first fuel economy, the controller may determine that is more fuel efficient to transition, and the controller may transition the engine to the second water injection state. In addition, the controller may transition the engine to the knock-adjusted engine speed-load profile via adjustments to a speed ratio of the CVT.

Turning now to FIG. 5, example fuel usage adjustments coordinated with CVT adjustments are shown at map 500. Map 500 depicts changes to an engine speed at plot 502, engine load at plot 504, engine power at plot 506, water injection state selection (between a first state with water injection disabled and a second state with water injection enabled) at plot 508, and an indication of knock at plot 510. All plots are shown over time (along the x-axis). Significant timepoints during vehicle operation are shown at t1-t4. It will be appreciated that as used herein, the engine power is determined as a product of engine speed and engine load (or torque). In addition, the engine speed-load adjustments are achieved via adjustments to a speed ratio of a CVT coupled between the engine and an output shaft. In the present example, the water injection state is switchable between an active and an inactive state, although in alternate examples, multiple active states may be present, each representing a different mode/location of water injection (e.g., direct or port or central water injection).

Prior to t1, the engine may be operating to provide a power output that is delivered via the depicted engine speed-load profile and with the engine operating with water injection enabled (such as due to water levels in a water tank being higher than a threshold level). At t1, in response to an increase in driver demand, the power output of the engine may be increased. Herein, the power output is increased by transitioning to engine operation with water injection deactivated due to the inactive state being more efficient. In addition, further fuel economy benefits are achieved by adjusting the engine speed-load profile while operating in the water injection inactive state via CVT adjustments so that the same engine power is provided using a higher than default engine speed and a lower than default engine load. The default engine speed and load (for the given fuel) are depicted here as dashed lines. In particular, if the engine were operated with water injection maintained and operated with the default engine speed-load, the engine would have been knock limited, as indicated by predicted knock sensor output 512 (dashed segment) exceeding the knock threshold (Knk_Thr). Herein, by transitioning to the water injection deactivated state and lower engine load via CVT adjustments, knock at higher loads is addressed while improving the overall engine fuel economy, and without compromising engine power output.

The engine may operate with the higher than default engine speed and lower than default engine load at the lower octane fuel for a duration until t2. At t2, in response to a drop in driver demand, the engine may be operated with water injection inactive state maintained while resuming the default engine speed and default engine load due to the engine not being knock limited any more. This operation may be maintained until t3.

At t3, in response to a decrease in driver demand, the power output of the engine may be decreased. Herein, the power output is decreased by transitioning to operating the engine with water injection enabled due to the water injection active state being more fuel efficient. In addition, further fuel economy benefits are achieved by adjusting the engine speed-load profile via CVT adjustments so that the same engine power is provided using a lower than default engine speed and a higher than default engine load. The default engine speed and load (for the given fuel) are depicted here as dashed lines. In particular, if the engine were transitioned to the water injection active state and operated with the default engine speed-load, the engine could have been friction limited. Herein, by transitioning to the lower engine speed and higher engine load via CVT adjustments while transitioning to using water injection, friction losses at lower loads are reduced, while improving the overall engine fuel economy, and without compromising engine power output.

It will be appreciated that if the water availability at t3 is low (such as due to a water level in a water tank being lower than a threshold level), then even though operating with the water injection is more efficient, it may be possible. In such a scenario, the controller may maintain engine operation with the water injection disabled. In addition, the engine speed-load profile may be adjusted while in the water injection inactive state via CVT adjustments. For example, the same engine power may be provided using a higher than default engine speed and a lower than default engine load.

In this way, fuel efficiency of an engine can be improved by integrating water injection technology with CVT technology. By leveraging the different engine speed-load combinations achievable for a given engine power output via CVT adjustments, an engine controller can more accurately address engine limitations, such as knock limitations associated with a water injection state transition. As such, this allows the costs associated with a transition to be more accurately determined, reducing the frequency of inefficient switches responsive to frequent changes in operator or wheel torque demand, or due to changes in water availability. Overall, fuel economy of an engine can be enhanced.

One example method for an engine configured with water injection, the engine coupled with a continuously variable transmission (CVT), comprises: for a power level, comparing fuel economy without water injection to fuel economy with water injection at an adjusted engine speed-load; and in response to a higher than threshold improvement in the fuel economy with water injection at the adjusted engine speed-load, injecting an amount of water into the engine and changing to the adjusted engine speed-load. In the preceding example, additionally or optionally, the method further comprises, in response to the higher than threshold improvement in the fuel economy with water injection at the adjusted engine speed-load but a lower than threshold level of water in a water reservoir, maintaining engine operation without water injection. In any or all of the preceding examples, additionally or optionally, the adjusted engine speed-load is a first adjusted engine speed load, the method further comprising, while maintaining engine operation without water injection, transitioning to a second adjusted engine speed-load, different from the first adjusted engine speed-load. In any or all of the preceding examples, additionally or optionally, the method further comprises, in response to a lower than threshold improvement in the fuel economy, maintaining engine operation without water injection and transitioning to the second adjusted engine speed-load. In any or all of the preceding examples, additionally or optionally, the first adjusted engine speed-load is based on a knock limit of engine operation with water injection, and the second adjusted engine speed-load is based on a knock limit of engine operation without water injection. In any or all of the preceding examples, additionally or optionally, the first adjusted engine speed-load includes a lower than default engine speed and a higher than default engine load. In any or all of the preceding examples, additionally or optionally, the second adjusted engine speed-load includes a higher than default engine speed and a lower than default engine load. In any or all of the preceding examples, additionally or optionally, an engine speed of the first adjusted engine speed-load is decreased and an engine load of the first adjusted engine speed-load is increased to maintain the power level as the knock limit of engine operation with water injection is approached. In any or all of the preceding examples, additionally or optionally, the engine speed of the second adjusted engine speed-load is increased and the engine load of the second adjusted engine speed-load is decreased to maintain the power level as the knock limit of engine operation without water injection is approached. In any or all of the preceding examples, additionally or optionally, changing to the adjusted engine speed-load includes selecting a CVT speed ratio matching the adjusted engine speed-load. In any or all of the preceding examples, additionally or optionally, the power level is maintained at each of engine operation without water injection and engine operation with water injection with the adjusted engine speed-load, and wherein the power level is a powertrain output of the engine determined as a product of engine load and engine speed. In any or all of the preceding examples, additionally or optionally, injecting an amount of water includes one or more of directly water into an engine cylinder via a direct water injector, injecting water into an intake port upstream of an intake valve via a port water injector, and injecting water into an intake manifold, upstream or downstream of an intake throttle, via central water injector.

Another example method for an engine coupled with a continuously variable transmission (CVT), comprises: for a driver demand, estimating a first efficiency associated with operating the engine with water injection disabled and a second efficiency associated with operating the engine with water injection enabled while operating with a knock-adjusted and friction-adjusted engine speed-load profile; and in response to the second efficiency being higher than the first efficiency, and a water availability being higher than a threshold, enabling water injection and transitioning to the knock-adjusted and friction-adjusted engine speed-load profile via adjustments to a speed ratio of the CVT. In the preceding example, additionally or optionally, the method further comprises, in response to the second efficiency being lower than the first efficiency or the water availability being lower than the threshold, maintaining water injection disabled and optionally transitioning to the knock-adjusted and friction-adjusted engine speed-load profile via adjustments to the speed ratio of the CVT. In any or all of the preceding examples, additionally or optionally, the lower than threshold water availability is due to one of a lower than threshold level of water in a water reservoir of a water injection system, and degradation of a component of the water injection system, the component including a water injector and a water pump. In any or all of the preceding examples, additionally or optionally, transitioning to the knock-adjusted and friction-adjusted engine speed-load profile includes transitioning from a default engine speed-load profile of engine operation with water injection disabled, and wherein an engine power output during engine operation with water injection disabled and the default engine speed-load profile is same as the engine power output during engine operation with water injection enabled and the knock-adjusted and friction-adjusted engine speed-load profile. In any or all of the preceding examples, additionally or optionally, the friction-adjusted engine speed-load profile includes a lower engine speed and a higher engine load compared to the default engine speed-load profile. In any or all of the preceding examples, additionally or optionally, enabling water injection includes enabling one or more of a direct water injector coupled to an engine cylinder, a port water injector coupled to an intake port, and a central water injector coupled to an intake manifold.

Another example vehicle system comprises: an engine; a fuel injector for delivering fuel from a fuel tank to the engine; a water injector for delivering water from a water reservoir to the engine; a continuously variable transmission (CVT) coupling the engine to vehicle wheels, the CVT having a plurality of speed ratios; and a controller. The controller may be configured with computer readable instructions stored on non-transitory memory for: estimating a first efficiency associated with operating the engine with the water injector deactivated and a second efficiency associated with operating the engine with a first modified engine speed-load profile and the water injector activated; if the second efficiency is higher than the first efficiency, and a water level in the water reservoir is higher than a threshold, activating the water injector while selecting one of the plurality of speed ratios of the CVT to provide the first modified engine speed-load profile; and if the second efficiency is lower than the first efficiency, or the water level in the water reservoir is lower than the threshold, deactivating the water injector while selecting another one of the plurality of speed ratios of the CVT to provide a second modified engine speed-load profile, different from the first modified engine speed-load profile. In the preceding example, additionally or optionally, the first modified engine speed-load profile is based on an engine knock limit and engine friction when operating with water injection, wherein the second modified engine speed-load profile is based on an engine knock limit and engine friction when operating without water injection, and wherein the first modified engine speed-load profile has a lower engine speed and a higher engine load than the second modified engine speed-load profile.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine configured with water injection, comprising:
   for a power level, comparing fuel economy without water injection to fuel economy with water injection at an adjusted engine speed-load; and
   in response to a higher than threshold improvement in the fuel economy with water injection at the adjusted engine speed-load, injecting an amount of water into the engine and changing to the adjusted engine speed-load via a continuously variable transmission (CVT).

2. The method of claim 1, further comprising, in response to the higher than threshold improvement in the fuel economy with water injection at the adjusted engine speed-load but a lower than threshold level of water in a water reservoir, maintaining engine operation without water injection.

3. The method of claim 2, wherein the adjusted engine speed-load is a first adjusted engine speed load, the method further comprising, while maintaining engine operation without water injection, transitioning to a second adjusted engine speed-load, different from the first adjusted engine speed-load.

4. The method of claim 3, further comprising, in response to a lower than threshold improvement in the fuel economy, maintaining engine operation without water injection and transitioning to the second adjusted engine speed-load.

5. The method of claim 3, wherein the first adjusted engine speed-load is based on a knock limit of engine operation with water injection, and the second adjusted engine speed-load is based on a knock limit of engine operation without water injection.

6. The method of claim 5, wherein the first adjusted engine speed-load includes a lower than default engine speed and a higher than default engine load.

7. The method of claim 6, wherein the second adjusted engine speed-load includes a higher than default engine speed and a lower than default engine load.

8. The method of claim 5, wherein an engine speed of the first adjusted engine speed-load is decreased and an engine load of the first adjusted engine speed-load is increased to maintain the power level as the knock limit of engine operation with water injection is approached.

9. The method of claim 8, wherein the engine speed of the second adjusted engine speed-load is increased and the engine load of the second adjusted engine speed-load is decreased to maintain the power level as the knock limit of engine operation without water injection is approached.

10. The method of claim 1, wherein changing to the adjusted engine speed-load includes selecting a CVT speed ratio matching the adjusted engine speed-load.

11. The method of claim 1, wherein the power level is maintained at each of engine operation without water injection and engine operation with water injection with the adjusted engine speed-load, and wherein the power level is a powertrain output of the engine determined as a product of engine load and engine speed.

12. The method of claim 1, wherein injecting the amount of water includes one or more of directly injecting water into an engine cylinder via a direct water injector, injecting water into an intake port upstream of an intake valve via a port water injector, and injecting water into an intake manifold, upstream or downstream of an intake throttle, via central water injector.

13. A method for an engine coupled with a continuously variable transmission (CVT), comprising:
for a driver demand,
estimating a first efficiency associated with operating the engine with water injection disabled and a second efficiency associated with operating the engine with water injection enabled while operating with a knock-adjusted and friction-adjusted engine speed-load profile; and
in response to the second efficiency being higher than the first efficiency, and a water availability being higher than a threshold, enabling water injection and transitioning to the knock-adjusted and friction-adjusted engine speed-load profile via adjustments to a speed ratio of the CVT.

14. The method of claim 13, further comprising, in response to the second efficiency being lower than the first efficiency or the water availability being lower than the threshold, maintaining water injection disabled and optionally transitioning to the knock-adjusted and friction-adjusted engine speed-load profile via adjustments to the speed ratio of the CVT.

15. The method of claim 14, wherein the lower than threshold water availability is due to one of a lower than threshold level of water in a water reservoir of a water injection system, and degradation of a component of the water injection system, the component including a water injector and a water pump.

16. The method of claim 13, wherein transitioning to the knock-adjusted and friction-adjusted engine speed-load profile includes transitioning from a default engine speed-load profile of engine operation with water injection disabled, and wherein an engine power output during engine operation with water injection disabled and the default engine speed-load profile is same as the engine power output during engine operation with water injection enabled and the knock-adjusted and friction-adjusted engine speed-load profile.

17. The method of claim 16, wherein the friction-adjusted engine speed-load profile includes a lower engine speed and a higher engine load compared to the default engine speed-load profile.

18. The method of claim 13, wherein enabling water injection includes enabling one or more of a direct water injector coupled to an engine cylinder, a port water injector coupled to an intake port, and a central water injector coupled to an intake manifold.

19. A vehicle system, comprising:
an engine;
a fuel injector for delivering fuel from a fuel tank to the engine;
a water injector for delivering water from a water reservoir to the engine;
a continuously variable transmission (CVT) coupling the engine to vehicle wheels, the CVT having a plurality of speed ratios; and
a controller with computer readable instructions stored on non-transitory memory for:
estimating a first efficiency associated with operating the engine with the water injector deactivated and a second efficiency associated with operating the engine with a first modified engine speed-load profile and the water injector activated;
if the second efficiency is higher than the first efficiency, and a water level in the water reservoir is higher than a threshold, activating the water injector while selecting one of the plurality of speed ratios of the CVT to provide the first modified engine speed-load profile; and
if the second efficiency is lower than the first efficiency, or the water level in the water reservoir is lower than the threshold, deactivating the water injector while selecting another one of the plurality of speed ratios of the CVT to provide a second modified engine speed-load profile, different from the first modified engine speed-load profile.

20. The system of claim 19, wherein the first modified engine speed-load profile is based on an engine knock limit and engine friction when operating with water injection, wherein the second modified engine speed-load profile is based on an engine knock limit and engine friction when operating without water injection, and wherein the first modified engine speed-load profile has a lower engine speed and a higher engine load than the second modified engine speed-load profile.

\* \* \* \* \*